March 3, 1953  J. W. HURSH  2,630,555
MOTOR CONTROL SYSTEM
Filed Sept. 30, 1950
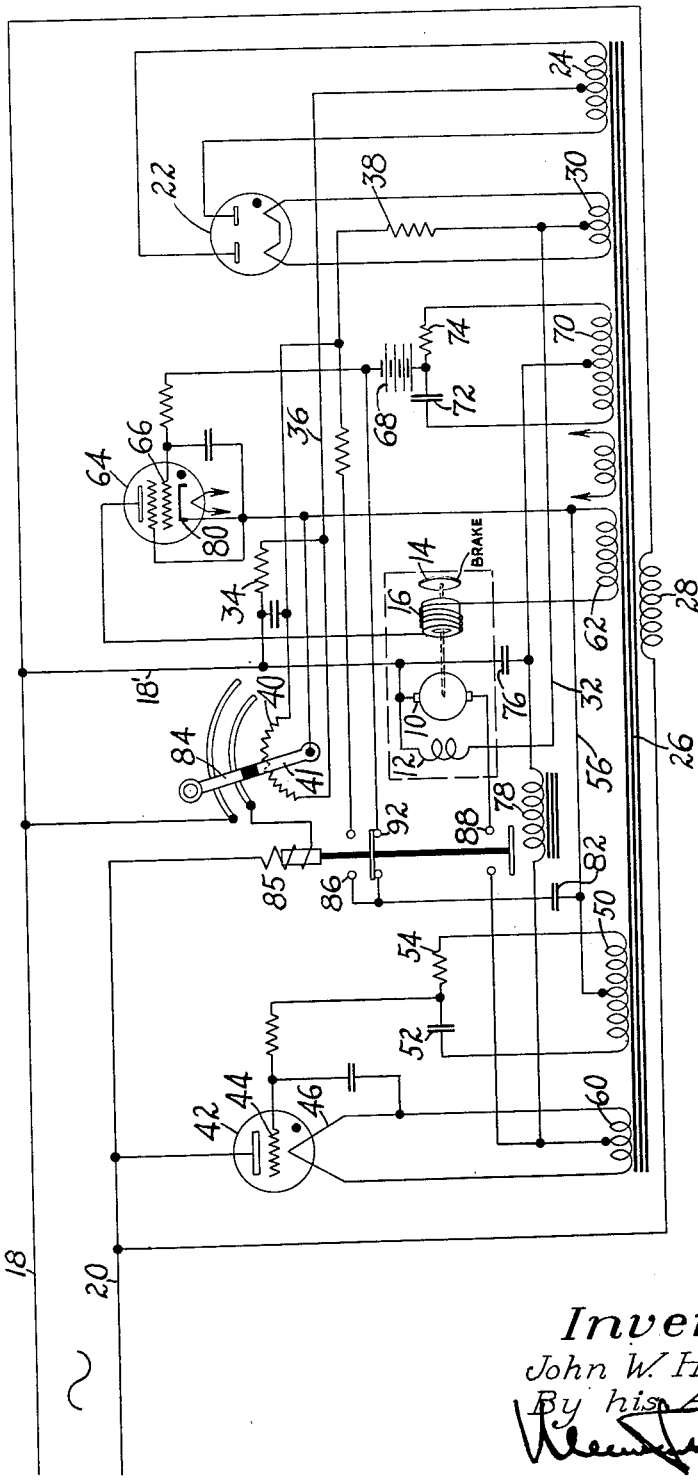
Inventor
John W. Hursh
By his Attorney Patented Mar. 3, 1953

2,630,555

UNITED STATES PATENT OFFICE 2,630,555

MOTOR CONTROL SYSTEM

John W. Hursh, Newburyport, Mass., assignor to United Shoe Machinery Corporation, Flemington, N. J., a corporation of New Jersey Application September 30, 1950, Serial No. 187,775

11 Claims. (Cl. 318—269)

This invention relates to an electric motor control system and more particularly to improvements in such a system for controlling the speed of a motor to provide a variable speed drive while providing rapid response to slow-down control.

It is customary, in certain variable speed controls for electric motors, to control the energization of the motor in accordance with an error signal derived from a voltage proportional to the actual motor speed and from a control voltage proportional to the desired speed. When the motor is connected to drive a load, the inertia of the mechanical system tends to oppose speed changes. While the motor energization is effective to provide rapid response to a demand for increased speed, rapid reduction in speed requires a retarding force not provided by the motor.

Accordingly, systems have been provided wherein braking is applied upon cessation of the energization of the motor. Such systems are subject to the disadvantage that interruptions of energization of the motor do not necessarily reflect departure of its actual speed from a desired speed. For example, brief accidental interruptions of the energization of the motor may result in undesirable braking. Also, when it is desired to reduce the motor speed to a lower speed, the braking force applied during interruption of energization may still be applied at the desired reduced speed, and consequently may produce undesirable hunting.

An object of the invention is accordingly to provide a motor control having electric braking means wherein the energization of the motor and the energization of the braking means are both independently controlled by an error signal voltage including a component proportional to the actual motor speed and a control voltage component proportional to the desired speed.

A further object of the invention is to provide such a motor control system wherein the braking means are controlled to apply a braking influence to the motor responsively to said error signal only when the actual motor speed exceeds the desired motor speed.

While such an arrangement is advantageous in providing free running of the motor at the desired speed, it will be apparent that the margin of speed difference before the braking takes effect would militate against rapid stopping from a slow motor speed inasmuch as the motor speed might be within the limit of tolerance or just above the limit so that upon adjustment of the control voltage to a zero speed condition either no braking will take place or only a short period of braking.

Accordingly, it is a further object of the invention to provide auxiliary means operative responsively to the movement of a manually adjustable element of a speed controller into a predetermined position in reducing the speed-controlling voltage to a substantially zero speed condition for providing energization of the braking means.

Other objects and features of my invention will be apparent from the following description taken in conjunction with the embodiment schematically diagrammed in the accompanying drawing.

An electric motor having an armature 10 and a shunt field 12 is represented in the drawing as having its armature connected to the friction plate 14 of an electric brake having a winding 16 adapted to be energized for applying a braking influence to oppose rotation of the armature. Such energizable friction brakes are commercially available, and since the particular form of the brake constitutes no part of my invention, I will not describe it in further detail.

The field 12 of the motor is energized by a direct current, derived from a source of alternating current supplied to the leads 18 and 20, by means of a rectifier comprising the full-wave rectifier tube 22 connected to a secondary 24 of the step-up, step-down transformer 26 whose primary 28 is connected across the leads 18 and 20. The circuit for energizing the field 12 may be traced from the positive terminal of the rectifier at the center tap of a filament winding 30 along lead 32, through the field 12, to lead 18', through a resistor 34, and along lead 36 to the negative terminal at the mid-portion of the winding 24. Current from the rectifier also flows in a path from the mid point of winding 30, through a resistor 38 and a potentiometer 40 having a manually adjustable slider 41 and back through lead 36 to the negative terminal, thereby to provide a source of a control voltage as will be described hereinafter. As shown in the diagram, as the slider 41 is moved to the left, the demanded motor speed is reduced until finally the slider reaches a zero-speed position. The range of movement of the slider or of its handle to the right of this position is referred to as its normal operating range.

The armature 10 of the electric motor is energized from the alternating current source under the control of the grid-controlled gas-filled vacuum tube 42. This tube is connected across the leads 18 and 20 in series with the armature to provide a controllable half-wave rectifier whose conductivity is determined by the bias applied between the grid 44 and the cathode 46. The grid-cathode circuit of the tube 42 may be traced from the grid 44, through a source of phase-shifted alternating voltage comprising the winding 50, condenser 52 and resistor 54, along lead 56 to the slider 41, through resistor 34 to the lead 18', through armature 10 and to the cathode 46 by connection to the mid tap of a filament heater winding 60.

Accordingly, it will be seen that the grid has a negative direct current bias with respect to the cathode comprising the armature voltage, which is proportional to the motor speed, less a control voltage. The control voltage may be considered to be the algebraic sum of the voltages comprising the voltage appearing across resistor 34 by reason of the flow of field current and the voltage appearing between the slider and the left end of potentiometer 40. The difference between these control voltages and armature voltage components provides an error signal bias voltage which raises or lowers the alternating bias provided by the phase-shifting circuit and thereby varies the conductivity of the tube 42 in accordance with the error signal. It will be seen that the handle of slider 41 provides a manually adjustable element for controlling the motor speed inasmuch as the control voltage taken off in any given position of the slider establishes a demanded motor speed since the conductivity of the tube 42 is varied by variations in the error voltage in a direction to maintain the armature voltage in substantial balance with the control voltage.

The winding 16 of the electric brake is energized from a secondary winding 62 under the control of a vacuum tube 64 connected in series therewith. The grid circuit of this tube may be traced from the grid 66, through a battery 68 providing a negative component of grid bias, through a resistor 74 to the mid tap of a secondary winding 70, and then through an inductance 78, contacts 88, the armature 10, to lead 18', through resistor 34 and potentiometer 40 to the slider 41 and from the slider to the cathode 80. The voltage across the armature is filtered by the inductance 78 and a condenser 76. The combination of a condenser 72 with the resistance 74 and winding 70 provides a phase-shifted alternating voltage between the battery 68 and the mid tap of winding 70. It will be seen that the bias voltages thus applied are similar to those applied to the tube 42 (although opposite in sense) with the addition of a negative voltage component supplied by the battery 68. Accordingly, for any setting of the controller, the tube 64 is biased for conductivity at a higher armature voltage than is the tube 42.

When the electric motor is connected to drive a machine such, for example, as a sewing machine, conduction in the tube 42 tends to assume an equilibrium wherein the armature voltage substantially equals the control voltage. If now the control voltage should be reduced to establish a reduced demand speed by moving the slider toward the left end of potentiometer 40, the conduction of tube 42 is reduced or cut off entirely. At the same time, by the reduction of control voltage relative to the armature voltage, the grid 66 is biased correspondingly more positively. Thus when the actual motor speed exceeds the demanded speed by more than the difference predetermined by the negative bias voltage provided by the battery 68, the tube 64 will conduct to energize the electric brake and quickly reduce the armature speed until reduction of the armature voltage causes the tube 64 to become non-conductive.

Where the electric motor has been running at a low speed, repositioning of the slider 41 at the zero speed position may provide an insufficient positive swing on the grid 66 to overcome the negative bias of the battery 68. Accordingly, means responsive to such movement are provided for imposing an auxiliary bias between the grid 66 and cathode 80 to provide conduction in the tube 64. For this purpose a condenser 82 is arranged to be connected between the grid 66 and cathode 80 by a switch 84 arranged for operation by the handle of slider 41 and illustrated as comprising a contact member attached to the handle. The contact member cooperates with arcuate bars which terminate short of the range of movement to the left of slider 41 at approximately the zero speed position. These bars are included in the energizing circuit of an electromagnetic switch 85. When the handle of slider 41 is moved into the normal operating range, switch 84 is closed closing the condenser charging contacts 86 and the armature contacts 88 of the switch 85. During this time, condenser 82 is charged by the voltage appearing between the slider 41 and the right end of the potentiometer through the resistor 90 in such a sense as to impose a positive charge on the upper plates of the condenser and a negative charge on the bottom plates. When the controller is moved to the left, progressively toward the zero-speed position, condenser 82 is further charged as this charging voltage increases. Finally substantially at the zero speed position switch 84 is opened, contacts 86 and 88 are opened, and contacts 92, also on switch 85, are closed to put the condenser across the grid circuit. Accordingly, the tube 64 is rendered conductive and the motor is braked to a rapid stop.

In operation, with the apparatus warmed up and ready to operate, the operator moves the slider 41, by means of its handle, up to a position in the normal operating range. This closes the contacts of switch 84 to close contacts 86 and 88 of the switch 85, respectively to charge condenser 82 and to energize the armature to attain a motor speed corresponding to the position of the slider. Meanwhile the brake tube 64 is maintained nonconductive since the armature voltage, in rising to balance with the control voltage, will not overcome the negative bias provided by the control voltage plus the battery voltage.

In reducing the speed, the operator moves the slider to the left to reduce the control voltage. Braking, however, commences only when the excess of the armature voltage over the control voltage overcomes the battery voltage. At this time, in known manner, the alternating component of bias commences to intersect the critical grid voltage of the brake tube, to provide a brake current increasing progressively thereafter with increase of such excess or error voltage until it reaches a maximum.

In stopping, the operator moves the slider to the left until switch 84 is opened, at which time the brake is energized by application of the condenser 82 voltage to the grid of tube 64.

Having thus described my invention, what I claim as new and desire to secure by Letters Patent of the United States is:

1. In a motor control system, in combination, an electric motor, an electric brake arranged to be energized for applying a braking force to said motor, voltage-responsive means for controlling the energization of said motor, voltage-responsive means for controlling the energization of said brake, and means for supplying to each of said controlling means voltage components including a voltage which is a function of the actual motor speed, and a control voltage.

2. In a motor control system, in combination, an electric motor, an electric brake arranged to be energized for applying a braking force to said motor, voltage-responsive means for controlling the energization of said motor, voltage-responsive means for controlling the energization of said brake and means for supplying oppositely to said controlling means a voltage component which is a function of the actual motor speed and a control voltage component.

3. In a motor control system, in combination, an electric motor, an electric brake arranged to be energized for applying a braking force to said motor, and first and second voltage-responsive means for controlling respectively the energization of said motor and said brake, and means for supplying to said first and second means in opposite polarity an error signal voltage comprising the difference between a voltage proportional to the actual motor speed and a control voltage establishing by its magnitude a demanded speed.

4. In an electric motor control system, in combination, an electric motor, an electric brake arranged to be energized for applying a braking force to said motor, first and second voltage-responsive means connected for controlling respectively the energization of said motor and said brake in response to variations in the relative magnitudes of a voltage proportional to the actual motor speed and a control voltage variable by movement of a manually adjustable element, and auxiliary means operative responsively to movement of the said element into a predetermined position for providing energization of said brake.

5. In a motor control system, in combination, a direct current motor having an armature, a first means for supplying alternating current, a grid-controlled vacuum tube connected between said means and said armature for controlling the energization of said armature from said source, an electric brake energizable to provide a braking influence on said armature, a second means for supplying alternating current, a grid-controlled vacuum tube connected between said second means and said brake for controlling the energization of said brake from said source, means for biasing the grids of both tubes in opposite senses by a voltage comprising the difference between the armature voltage and a control voltage, and means for introducing into the grid circuit of one of said tubes a fixed component of direct current voltage bias to prevent conduction of the brake-controlling tube while the armature-controlling tube is conductive.

6. In a motor control system, in combination, a direct current motor having an armature, a first means for supplying alternating current, a grid-controlled vacuum tube connected between said means and said armature for controlling the energization of said armature from said source, an electric brake energizable to provide a braking influence on said armature, a second means for supplying alternating current, a grid-controlled vacuum tube connected between said second means and said brake for controlling the energization of said brake from said last source, and means for biasing the grids of both tubes in opposite senses by a voltage proportional to the difference in magnitude between the armature voltage and a control voltage.

7. In an electric motor control system, in combination, an electric motor, an electric brake arranged to be energized to provide a braking influence on said motor, means comprising a manually adjustable element for providing a source of variable control voltage, means for controlling the energization of said motor in response to an error voltage proportional to the difference between a voltage proportional to the actual motor speed and said control voltage, a grid-controlled vacuum tube having said brake in its anode circuit and having its grid connected for biasing by said error voltage reversed in polarity plus an additional negative direct voltage component, and a switch operated by movement of said element into a predetermined position for applying a positive bias voltage across the grid and cathode of said tube.

8. In an electric motor control system, in combination, a direct current motor having an armature adapted to be energized and having field means independent of such energization, first means for supplying alternating current, a grid-controlled gas-filled vacuum tube connected between said supply means and said armature for controlling the energization thereof, a source of control voltage whose magnitude is variable by a manually adjustable element, means for biasing the control grid of said tube negatively by the armature voltage less the control voltage, an electric friction brake connected to said armature and having a winding adapted to be energized to increase the friction opposing movement of said armature, second means for supplying alternating current, a grid-controlled gas-filled vacuum tube connected between said second supply means and said brake winding, and means for biasing the control grid of said last tube negatively by the control voltage less the armature voltage.

9. Apparatus as in claim 8 wherein the means for biasing the brake-controlling tube comprises means for negatively biasing the grid of said tube from the control voltage plus a fixed voltage less the armature voltage.

10. Apparatus as in claim 9 and additionally comprising a switch operative to connect to the grid of the brake-controlling tube, in response to movement of said element up to a predetermined position, a voltage sufficient to cause said tube to become conductive.

11. In an electric motor control system, in combination, a direct-current electric motor, a first grid-controlled vacuum tube having the armature of said motor in its anode circuit, an electric brake, a second grid-controlled vacuum tube having the brake in its anode circuit, means for biasing the first tube by a negative component comprising the armature voltage and a positive component comprising a control voltage, and means for biasing the second tube by a negative component comprising the control voltage and a positive component comprising the armature voltage.

JOHN W. HURSH.

REFERENCES CITED

The following references are of record in the file of this patent:

UNITED STATES PATENTS

| Number | Name | Date |
| --- | --- | --- |
| 1,350,214 | Eisenmann | Aug. 17, 1920 |